United States Patent [19]

Kurosu et al.

[11] 4,299,469
[45] Nov. 10, 1981

[54] DRIVE CONTROLLING CIRCUIT FOR ELECTRIC SHUTTERS

[75] Inventors: Tomio Kurosu, Iwatsuki; Kouichi Okajima, Ageo, both of Japan

[73] Assignee: Copal Company Limited, Tokyo, Japan

[21] Appl. No.: 162,243

[22] Filed: Jun. 23, 1980

[30] Foreign Application Priority Data

Jun. 25, 1979 [JP] Japan .......................... 54-86933[U]
Dec. 28, 1979 [JP] Japan .............................. 54-184744

[51] Int. Cl.³ ........................................... G03B 17/38
[52] U.S. Cl. .................................. 354/268; 354/273; 354/289
[58] Field of Search ..................... 354/268, 273, 289

[56] References Cited

U.S. PATENT DOCUMENTS

| | | | |
|---|---|---|---|
| 3,969,735 | 7/1976 | Nobusawa | 354/268 |
| 4,024,553 | 5/1977 | Maitani et al. | 354/268 |
| 4,034,390 | 7/1977 | Urano et al. | 354/268 |
| 4,190,344 | 2/1980 | Ishiguro et al. | 354/289 |
| 4,223,987 | 9/1980 | Shimizu et al. | 354/289 |

Primary Examiner—Russell E. Adams
Attorney, Agent, or Firm—Cushman, Darby & Cushman

[57] ABSTRACT

A drive controlling circuit for electric shutters provided with a plurality of discriminating circuits for detecting failures and a plurality of warning circuits including buzzers or luminous diodes operated by the discriminating circuits in order that various failures of the shutter in use can be positively and quickly known. This controlling circuit makes impossible to release the shutter when something is wrong with the shutter.

17 Claims, 10 Drawing Figures

4,299,469

DRIVE CONTROLLING CIRCUIT FOR ELECTRIC SHUTTERS

BACKGROUND OF THE INVENTION (a) Field of the Invention

This invention relates to drive controlling circuits for electric shutters and more particularly to a controlling circuit whereby whether the shutter is being properly operated is detected and the result can be known.

(b) Description of the Prior Art

In most cases, in a microscopic camera or any industrial camera, only an electromagnetic actuator for directly driving shutter blades and a mechanical mechanism related with it are incorporated in the camera body but electric control circuit parts including a releasing switch and exposure time controlling circuit are contained in a control box provided separately from the camera body and the camera body and control box are used as connected with each other through cables.

In the camera of such system, it has been difficult and inconvenient in practice for the operator to know by the operation on the control box whether the shutter is operating accurately or not.

SUMMARY OF THE INVENTION

An object of the present invention is to provide a controlling circuit which detects the fact in the case that the shutter does not operate properly due to the failure of the mechanical mechanism, break of the coil of the electromagnetic actuator or faulty connection of the cables in the camera of the above mentioned system, warns the operator of the fact and works so as to be unable to make the next releasing operation.

According to the present invention, this object is attained by providing a switching means which is provided in association with an actuator, can take the first state and second state and can be switched from the first state over to the second state when the shutter is opened, a discriminating circuit which is connected to a shutter closing pulse generating circuit and the switching means and can issue an output signal when an output signal is issued from the shutter closing pulse generating circuit only in case the switching means is in the first state and a warning means which is connected to the discriminating circuit and can be operated by an output signal from the discriminating circuit.

According to a preferred formation of the present invention, the warning means is an OR gate, buzzer, luminous diode or electromagnet for obstructing the operation of shutter release.

This and other objects of the present invention will become more apparent during the course of the following detailed description and appended claims.

DESCRIPTION OF THE PREFERRED EMBODIMENT

Figure 1A:
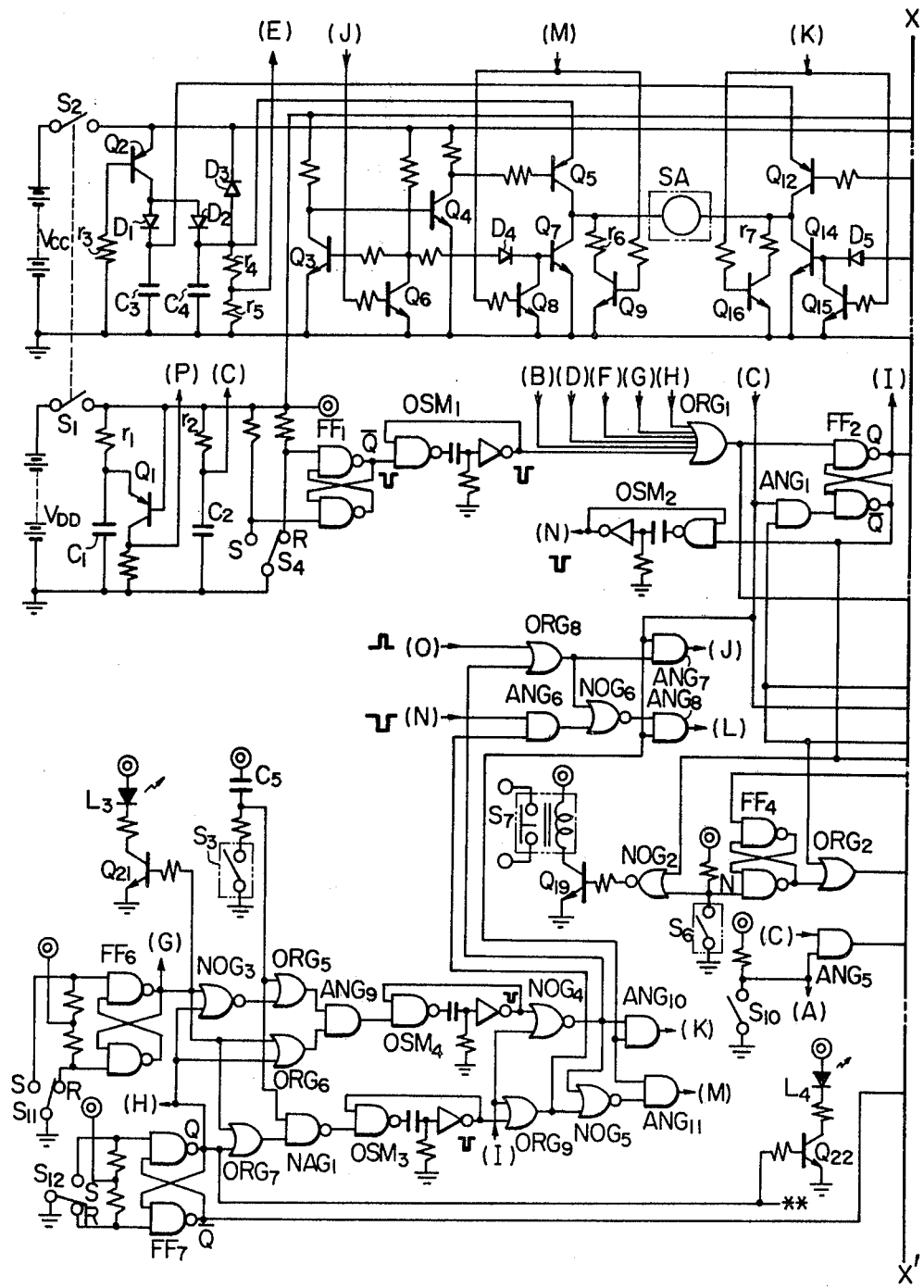
FIGS. 1 and 2 are wiring diagrams showing an embodiment of the controlling circuit according to the present invention.
Figure 1B:
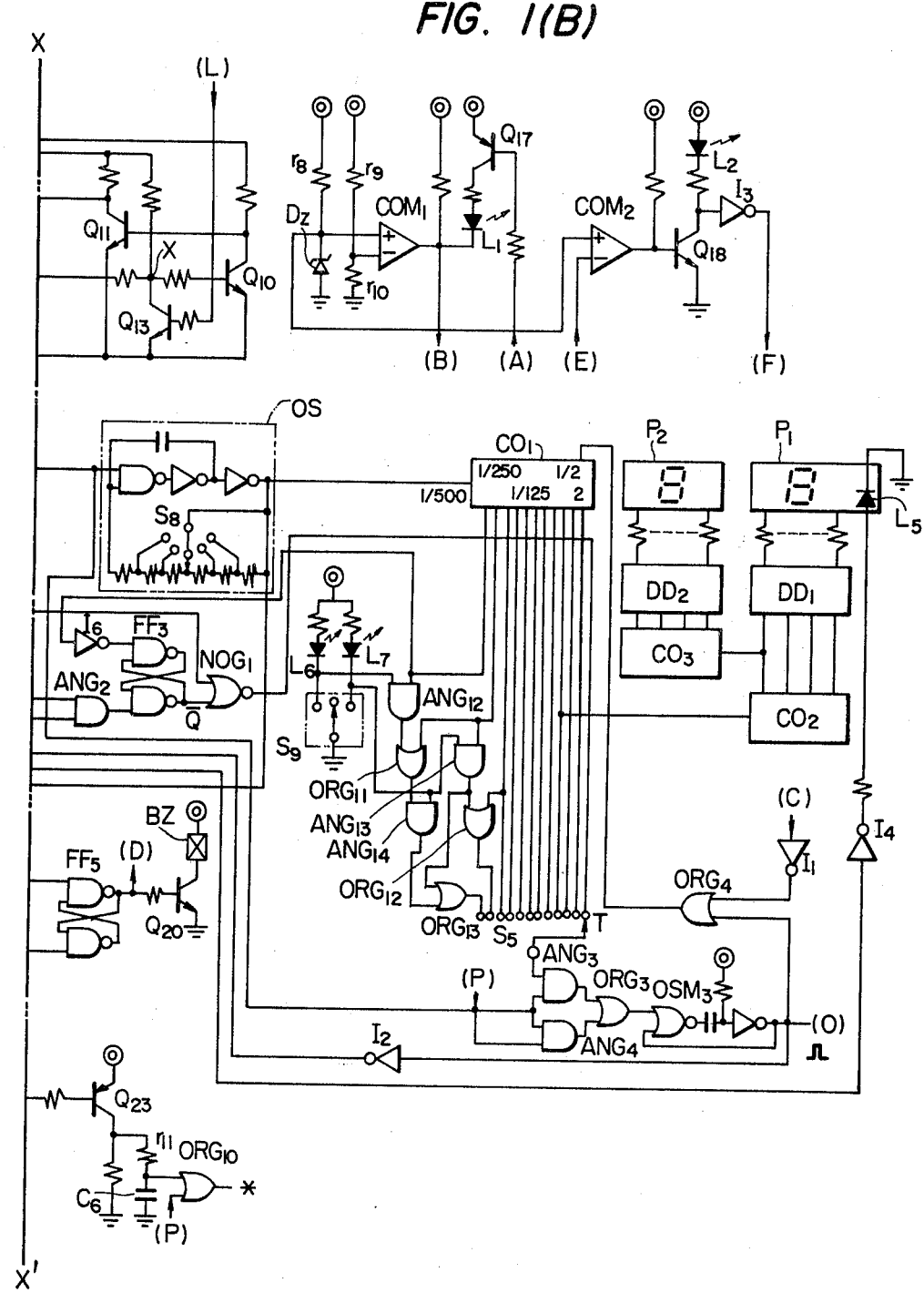
Figure 2:
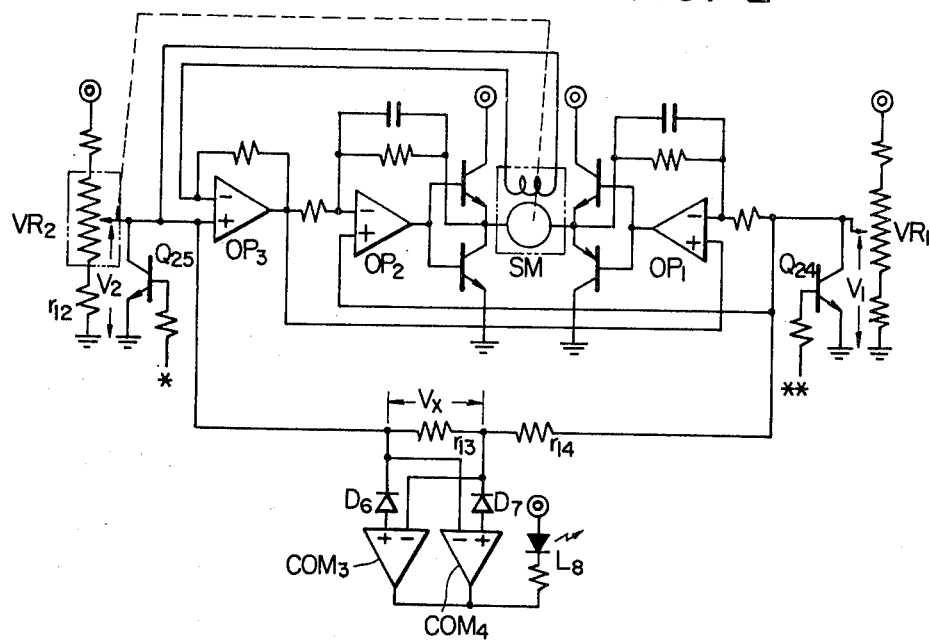

First of all, in FIGS. 1 and 2, symbols $S_1$ and $S_2$ denote current source switches, $S_3$ denotes a switch for sensing whether the camera is charged with a film or not, $S_4$ denotes a shutter releasing switch, $S_5$ denotes an exposure time setting switch, $S_6$ denotes a synchronizing operation switch, $S_7$ denotes a synchronizing control releasing switch, $S_8$ denotes an exposure amending switch, $S_9$ denotes a selecting switch, $S_{10}$ denotes a voltage checking switch, $S_{11}$ denotes a switch to be operated to be freely opened and closed and $S_{12}$ denotes a prefocusing switch. Symbol OS denotes an oscillating circuit for controlling the exposure time in which the oscillating frequency is switched by switching the switch $S_9$. $CO_1$ denotes an exposure time controlling counter in which the output terminal is so made as to be able to be selected by the switch $S_5$ and which is so formed as to be able to steppedly set the exposure time from 1/500 second to 2 seconds. $CO_2$ and $CO_3$ denote counters, $DD_1$ and $DD_2$ denote decoder drivers and $P_1$ and $P_2$ denote indicating elements respectively of a one-figure and 10-figure of seconds for indicating the lapse of exposure time over more than 1 second. SA denotes a shutter blade driving actuator which consists of an electromagnetic device or motor consisting of a combination of a movable coil, fixed permanent magnet or fixed coil and movable permanent magnet and such shutter blade driving member as a sector ring operated by said motor. Symbol SM (in FIG. 2) denotes a diaphragm blade driving servomotor, $VR_1$ denotes a diaphragm aperture setting potentiometer and $VR_2$ denotes a potentiometer which can be adjusted as operatively connected with the rotation of the servomotor SM. BZ denotes a buzzer, $V_{CC}$ denotes a current source battery and $V_{CC}$ denotes another current source which is boosted through a boosting circuit not illustrated from the current source battery $V_{DD}$.

In the drawing, a combination in parallel of two NAND gates forms a flip-flop circuit and a combination of a NAND gate or NOR gate with a capacitor, resistor and inverter forms a one-shot multivibrator circuit. Further, the part indicated by the same symbol of the alphabet and the part indicated by a double circle mean that they are respectively electrically connected with each other. Further, FIGS. 1 and 2 are electrically connected with each other also in the parts marked with * and **.

The operation shall be explained in the following.

When the current source switches $S_1$ and $S_2$ are first closed prior to a photographing operation, by the current source $V_{DD}$, a capacitor $C_1$ will be charged through a resistor $r_1$, at the same time, a capacitor $C_2$ will be charged through a resistor $r_2$ and voltages will be given respectively to a reference voltage dividing circuit consisting of a resistor $r_8$ and Zener diode $D_Z$ and a voltage dividing circuit consisting of resistors $r_9$ and $r_{10}$. On the other hand, by the current source $V_{CC}$, capacitors $C_3$ and $C_4$ will be charged respectively through a constant current circuit consisting of a resistor $r_3$ and transistor $Q_2$ and through diodes $D_1$ and $D_2$. The output of a comparator $COM_1$ in which both input terminals are connected respectively to the above mentioned reference voltage dividing circuit and the above mentioned other voltage dividing circuit will be on the "L" level in case the voltage of the current source $V_{DD}$ is above the rated value (Zenar voltage) but will be on the "H" level in case it is below the rated value. Now, when the voltage checking switch $S_{10}$ is closed and the base potential of a transistor $Q_{17}$ is lowered to be on the "L" lever, in case the output of the comparator $COM_1$ is above the above mentioned rated value, a luminous diode $L_1$ will light but, in case the output is below the rated value, the diode $L_1$ will not light. Therefore, the state of the voltage of the current source $V_{DD}$, that is, whether the voltage can be used or not can be known by the lighting or non-lighting of the luminous diode $L_1$. The output of the comparator $COM_1$ showing the voltage state of the current source $V_{DD}$ is given to one of the input terminals of an OR gate $ORG_1$. One end (c) of the capacitor $C_2$ will rise toward the voltage value of the current source $V_{DD}$ from the "L" level. However, when the counter $CO_1$ is reset through an inverter $I_1$ and OR gate $ORG_4$ by the "L" level signal and the charged potential reaches $\frac{1}{2}$ the voltage value of the current source $V_{DD}$ and exceeds the threshold level of the inverter $I_1$, the resetting signal will be released. Further, as the output of a one-shot multivibrator circuit $OSM_3$ is on the "L" level in the normal state, in an OR gate $ORG_2$, one input will be placed on the "H" level through the inverter $I_2$ and the output will be on the "H" level. On the other hand, as the output of an AND gate $ANG_5$ is on the "L" level in the initial state, the output of a flip-flop circuit $FF_5$ will be placed on the "L" level and will be held on the "L" level even if the output of the AND gate $ANG_5$ is reversed to the "H" level by the progress of charging of the capacitor $C_2$. The output signal of this flip-flop circuit $FF_5$ will be given to one of the input terminals of the OR gate $ORG_1$.

The charging voltage of the capacitor $C_4$ will be divided by the resistors $r_4$ and $r_5$ and will be given to the reversing input terminal of a comparator $COM_2$. Therefore, the output of the comparator $COM_2$ in which the reference voltage dividing circuit is connected to the non-reversing input terminal will be on the "H" level in the initial step and will conduct a transistor $Q_{18}$ to light a luminous diode $L_2$. Thereafter, when the charged voltage of the capacitor $C_4$ reaches a predetermined value, the output of the comparator $COM_2$ will reverse to the "L" level to cut off the transistor $Q_{18}$ and extinguish the luminous diode $L_2$. That is to say, it is shown as a result that, while the diode $L_2$ is lighting, the charging of the capacitor $C_4(C_3)$ will be still insufficient and that, when is extinguished, the capacitor will be sufficiently charged. Further, the signal of this charged state will be given to one of the input terminals of the OR gate $ORG_1$ through a inverter $I_3$. Further, when the switch $S_{11}$ is connected to the terminal R, the output of a flip-flop circuit $FF_6$ will be placed on the "L" level and its output signal will be given to one of the input terminals of the OR gate $ORG_1$. In the same manner, when the switch $S_{12}$ is connected to the terminal R, the output (Q) of a flip-flop circuit $FF_7$ will be placed on the "L" level and its output signal will be given to one of the input terminals of the OR gate $ORG_1$. As the output of a one-shot multivibrator circuit $OSM_1$ is placed on the "H" level in the normal state, the output of the OR gate $ORG_1$ will be on the "H" level. On the other hand, the output of an AND gate $ANG_1$ will reverse to the "H" level after a predetermined time with the progress of charging of the capacitor $C_2$ from the "L" level. Therefore, the output (Q) of a flip-flop circuit $FF_2$ will be held on the "L" level and the output $(\overline{Q})$ will be held on the "H" level. Further, as the output of a one-shot multivibrator circuit $OSM_4$ is on the "H" level in the normal state, the output of a NOR gate $NOG_4$ will be on the "L" level. Therefore, as the output of the one-shot multivibrator circuit $OSM_3$ is also on the "L" level, the output of an OR gate $ORG_8$ will be on the "L" level. As a result, the output of an AND gate $ANG_7$ will be on the "L" level to cut off a transistor $Q_6$. On the other hand, as the output of the AND gate $ANG_7$ is also on the "L" level, transistors $Q_{15}$ and $Q_{16}$ will be also cut off. As the output of a one-shot multivibrator circuit $OSM_5$ is on the "H" level in the normal state, the output of an OR gate $ORG_9$ will be on the "H" level. On the other hand, the output of a one-shot multivibrator circuit $OSM_2$ will be on the "H" level in the normal state. Therefore, as the output of an AND gate $ANG_6$ is on the "H" level, the output of a NOR gate $NOG_6$ is on the "L" level, the output of an AND gate $ANG_8$ is on the "L" level, a transistor $Q_{13}$ will be also cut off. On the other hand, as the output of the OR gate $ORG_9$ is on the "H" level, the output of a NOR gate $NOG_5$ will be on the "L" level. As the output of an AND gate $ANG_{11}$ is on the "L" level, transistors $Q_8$ and $Q_9$ will be also cut off. Further, as transistors $Q_3$ and $Q_{10}$ conduct to cut off the transistors $Q_4$, $Q_5$, $Q_{11}$ and $Q_{12}$, no current will be fed also to transistors $Q_7$ and $Q_{14}$ and will not flow to the actuator SA. Therefore, the shutter will be closed.

Mostly with reference to FIG. 2, the setting and operation of the diaphragm aperture shall be briefly described in the following.

When the diaghragm aperture is determined by adjusting a potentiometer $VR_1$, the output voltages of operation amplifiers $OP_1$ and $OP_2$ will become different from each other, the electric current in the direction according to the difference will flow to a servomotor SM which will thus rotate by the angle corresponding to the difference. The diaphragm blades will be moved by this rotation of the servomotor and a potentiometer $VR_2$ will be operated to balance the output of the operation amplifier $OP_2$ with the output of the operation amplifier $OP_1$. This operation of setting the diaphragm aperture of the diaphragm blades is so made as to be indicated by lighting a luminous diode $L_8$ through comparators $COM_3$ and $COM_4$ (the respective output steps being of an open collector type). That is to say, if the divided voltage of the potentiometer $VR_1$ is $V_1$ and the divided voltage of the potentiometer $VR_1$ is $V_2$, the voltage $V_x$ applied the non-reversing input terminal (+) and reversing input terminal (−) to which diodes $D_6$ and $D_7$ of the comparators $COM_3$ and $COM_4$ are respectively connected will be represented by $V_x = (V_1 - V_2) \times r_{13}/(r_{13} + r_{14})$.

As the condition of lighting the luminous diode $L_8$ is that the output of either of the comparators $COM_3$ and $COM_4$ is on the "L" level, if the jointed voltage of the diodes $D_6$ and $D_7$ if $V_F$, when $V_x > V_F$ or $-V_x > V_F$, that is, when $|V_x| > V_F$, the diode $L_8$ will light. Therefore, when the voltage $V_x$ obtained by dividing the potential difference between the divided voltages $V_1$ and $V_2$ by resistors $r_{13}$ and $r_{14}$ is within the range of $\pm V_F$, and insensitive band not lighting the diode $L_8$ will be held. Therefore, generally the diode $L_8$ will light when the diaphragm aperture is set by the potentiometer $VR_2$ but will go out when the diaphragm blades somewhat approach the set aperture position. Further, the exposure time setting switch $S_5$ is connected to the later described time exposure position in the illustrated state but will be selectively connected to the output terminal of the counter $CO_1$ corresponding to the exposure time to be set in setting the exposure time of 1/500 second to 2 seconds.

The shutter operation after the diaphragm aperture and exposure time are set at desired values shall be detailed in the following.

Figure 3:
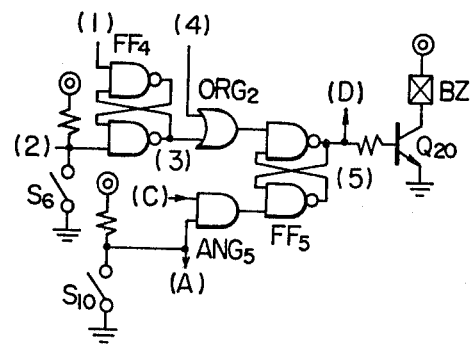
FIG. 3 is an explanatory view for explaining the operation of a shutter operation detecting part in FIG. 1.
Figure 3:
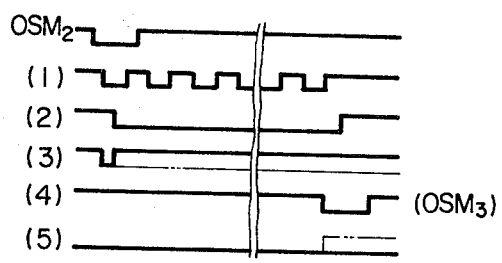
Figure 4:
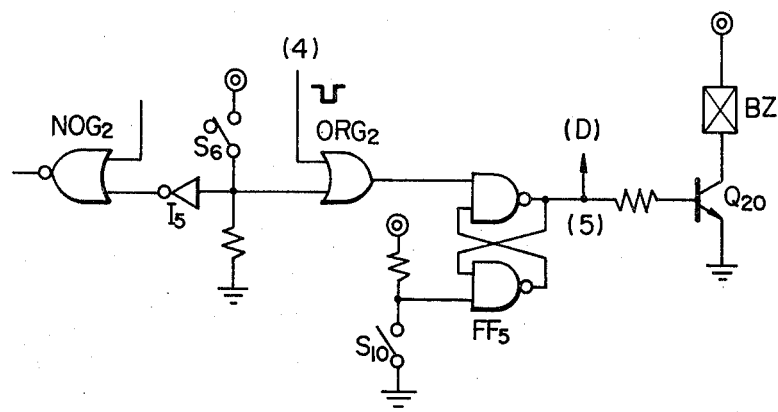
FIG. 4 is a wiring diagram showing another embodiment of the shutter operation detecting part.

When the shutter releasing switch $S_4$ is temporarily switched over to the terminal S from the terminal R, the output $(\overline{Q})$ of a flip-flop circuit $FF_1$ will temporarily reverse to the "L" level and, as a result, the output of a one-shot multivibrator $OSM_1$ will reverse to the "L" level for a very short time. As all the output of the OR gate $ORG_1$ is on the "L" level, the output will reverse to the "L" level, will set the flip-flop circuit $FF_2$, will reverse the output (Q) to the "H" level and will reverse the output $(\overline{Q})$ to the "L" level. When the output $(\overline{Q})$ of the flip-flop circuit $FF_2$ reverses to the "L" level, the output of the one-shot multivibrator $OSM_2$ will reverse to the "L" level for a predetermined time. As a result, the output of the AND gate $ANG_6$ will reverse to the "L" level for a predetermined time and will reverse the output of the NOR gate $NOG_6$ to the "H" level for a predetermined time. Therefore, the output of the AND gate $ANG_8$ will reverse to the "H" level for a predetermined time and will conduct the transistor $Q_{13}$ for a predetermined time. Therefore, the transistor $Q_{10}$ and a transistor $Q_{14}$ will be cut off, the transistor $Q_{11}$ will conduct, the transistor $Q_{12}$ will become able to conduct and therefore the electric charge of the capacitor $C_3$ will be momentarily discharged to drive the actuator SA in one direction and open the shutter blades. After a predetermined time, when the output of the one-shot multivibrator $OSM_2$ returns again to the "H" level, the transistor $Q_{13}$ will be cut off again and, after the shutter blades are driven to be opened, no current will flow again to the actuator SA and the shutter blades will remain open. In this operation process, when the transistor $Q_{13}$ conducts, the potential at the point X will fall toward the zero level from the voltage level of the current source $V_{cc}$ to cut off the transistors $Q_{10}$ and $Q_{14}$ but, as a diode $D_5$ is connected to the base of the transistor $Q_{14}$, the transistor $Q_{14}$ will be cut off earlier. Further, when the transistor $Q_{13}$ is cut off and the potential at the point X rises toward the voltage level of the current source $V_{cc}$, the transistor $Q_{10}$ will conduct earlier than the transistor $Q_{14}$. Therefore, the order of conducting and cutting off the transistors $Q_{12}$ and $Q_{14}$ will be regulated, the capacitor $C_3$ will not be short-circuited with a loadless loop and the transistors will be prevented from being destroyed. On the other hand, the "L" level signal of the output $(\overline{Q})$ of the flip-flop circuit $FF_2$ will be given to one input terminal of a NOR gate $NOG_2$ and to a luminous diode $L_5$ as converted to the "H" level signal through a inverter $I_4$. Therefore, the luminous diode $L_5$ placed in the decimal point position of the indicating element $P_1$ indicating the one-figure of seconds to indicate the time elapsing after the exposure is started will light to indicate the fact that the shutter blades are opened. Further, in the above mentioned operation, when the shutter blades are fully opened, the synchronizing switch $S_6$ will be closed so that the output of the NOR gate $NOG_2$ will reverse to the "H" level to conduct a transistor $Q_{19}$ and close the synchronization control releasing switch $S_7$. Therefore, in case the flash device is attached, it will flash when the shutter blades are fully opened. Further, when the output (Q) of the flip-flop circuit $FF_2$ reverses to the "H" level, the signal will be given to one input terminal of each of AND gates $ANG_3$ and $ANG_4$ and to the oscillating circuit OS. Therefore, the oscillating circuit OS will start the operation to send clock pulses into the counter $CO_1$. By the way, the time of starting the operation of the oscillating circuit (the time when the output first reverses from the "H" level to the "L" level) will be slightly later than the time when the output (Q) of the flip-flop circuit $FF_2$ reverses to the "H" level. After the lapse of the exposure time set by selecting the output terminal of the counter $CO_1$ by the switch $S_5$, the output terminal will reverse to the "H" level. As a result, the output of the AND gate $ANG_3$ will reverse to the "H" level and the output of an OR gate $ORG_3$ will also reverse to the "H" level to operate the one-shot multivibrator circuit $OSM_3$. Therefore, on the output side of the one-shot multivibrator $OSM_3$, the signal of the "H" level will be generated for a predetermined time. With this signal, the counter $CO_1$ will be reset through an OR gate $ORG_4$, the flip-flop circuit $FF_2$ will be reset through the inverter $I_2$ and AND gate $ANG_1$, the output of the OR gate $ORG_8$ will be reversed to the "H" level for a predetermined time and the output of the AND gate $ANG_7$ will be reversed to the "H" level for a predetermined time. Therefore, the transistor $Q_6$ will conduct to cut off the transistors $Q_3$ and $Q_7$ and conduct the transistors $Q_4$ and $Q_5$. As a result, the electric charge of the capacitor $C_4$ will be discharged momentarily through the transistors $Q_5$ and $Q_{14}$ to drive the actuator SA in the opposite direction and close the shutter blades. Further, when the flip-flop circuit $FF_2$ is reset, the operation of the oscillating circuit OS will stop and the luminous diode $L_5$ will go out. The shutter operation detecting circuit part in the above mentioned operation shall be detailed with reference to FIG. 3. By the operation of the oscillating circuit OS, clock pulses will be given to the input of (1), a flip-flop circuit $FF_4$ will be set by the arrival of the first negative pulses and the output (3) $(\overline{Q})$ will reverse to the "L" level. However, thereafter, when the switch $S_6$ is closed by the shutter blade opening operation, the output (3) of the flip-flop circuit $FF_4$ will again reverse to the "H" level and, therefore, even if the "L" level signal is given to one input (4) of the OR gate $ORG_2$ by the generation of the shutter blade closing signal, the output of the flip-flop circuit $FF_5$ will be kept on the "L" level as it is. On the other hand, even if the shutter blade opening signal is generated, in case the shutter blades are not opened by any cause (a break of the coil in the actuator SA, a mechanical factor in the shutter blade driving mechanism or the later described faulty connection of the connector), the output (3) of the flip-flop circuit $FF_4$ will not be reset but will be placed in the "L" level state. Therefore, when the "L" level signal is given to one input (4) of the OR gate $ORG_2$ by the generation of the shutter closing signal, the output of the OR gate $ORG_2$ will reverse to the "L" level to set the flip-flop circuit $FF_5$ and reverse its output to the "H" level. As a result, a transistor $Q_{20}$ will conduct and the buzzer BZ will operate to inform that, in spite of the shutter releasing operation, no shutter blade opening and closing operation is made. The signal showing this abnormal state will be given to one (D) of the input terminals of the OR gate $ORG_1$ and the output of the OR gate $ORG_1$ will be held on the "H" level. Therefore, even if the releasing operation is made in this state, no substantial shutter release will be able to be made. The operation of the buzzer BZ is stopped and the release obstructing state is released by using the voltage checking switch $S_{10}$, that is to say, by once closing the switch $S_{10}$ and resetting the flip-flop circuit $FF_5$. One input signal of the flip-flop circuit $FF_4$ in addition to the output signal of the oscillating circuit may be even generated before the switch $S_6$ is closed after the OR gate $ORG_1$ reverses. Also, this input signal can be controlled through a delaying circuit. FIG. 4 shows an embodiment different from that in FIG. 3. That is to say, in the embodiment in FIG. 4, the flip-flop circuit $FF_4$ in FIG. 3 is removed and the circuits are somewhat simplified. Symbol $I_5$ denotes an inverter for the amendment accompanying the change of the setting position of the switch $S_{10}$. The operation in the embodiment in FIG. 4 is as follows. That is to say, when the shutter blades are opened and the switch $S_6$ is closed, the output of the OR gate $ORG_2$ will be held on the "H" level, therefore the closing signal will not be able to be set and the output (5) will be maintained on the "L" as it is. On the other hand, if the shutter blades are not opened and the switch $S_6$ remains open, when the "L" level signal is given to the input (4) by the generation of the closing signal, the output of the OR gate $ORG_2$ will reverse to the "L" level, therefore the flip-flop circuit $FF_5$ will be set and the output (5) will reverse to the "H" level. The later warning operation and release obstructing state are the same as those in the embodiment in FIG. 3.

Figure 5:
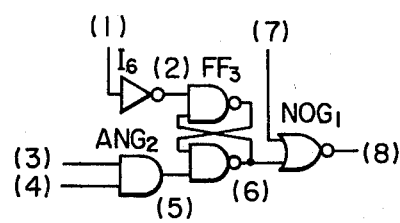
FIG. 5 is an explanatory view for explaining the operation of a time exposure controlling part in FIG. 1.
Figure 5:
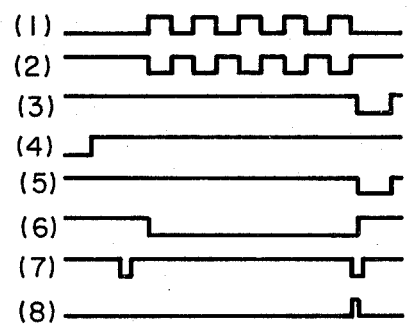

The time exposure photographing operation shall be explained in the following with reference to FIG. 5. The time exposure is made by connecting the switch $S_5$ to the output terminal of a NOR gate $NOG_1$ as shown in FIG. 1. When the switches $S_1$ and $S_2$ are closed in this state, the output (2) of an inverter $I_6$ will soon be on the "H" level, the output (5) of an AND gate $ANG_2$ will be on the "H" level as delayed in response to the charge of the capacitor $C_2$ by one input (4) and therefore the output (6) ($\overline{Q}$) of the flip-flop circuit $FF_3$ will be held on the "H" level. Therefore, the output (8) of the NOR gate $NOG_1$ will be placed on the "L" level. Therefore, when the releasing operation (first) is made the same as in the above described case, the shutter blades will open and, when the OR gate $ORG_1$ operates to reverse, negative pulses (of a width of 0.3 ms) corresponding to the operation of the one-shot multivibrator $OSM_1$ will ve given to the input (7) of the NOR gate $NOG_1$ but the NOR gate $NOG_1$ will not reverse and the output (8) will be held on the "L" level. On the other hand, as clock pulses are given to the input (1) of the inverter $I_6$ by the counter $CO_1$ after 1/500 second (2 ms), a signal reversing them will appear at the output (2). Therefore, when the output signal of the inverter $I_6$ first rises, the flip-flop circuit $FF_3$ will be set and the output will reverse to the "L" level. Further, as clock pulses at $\frac{1}{2}$ second of the counter $CO_1$ are given to the counter $CO_2$ and the output signal of the counter $CO_2$ is given to the counter $CO_3$, the indicating element $P_1$ indicating the one-figure of seconds and the indicating element $P_2$ indicating the 10-figure will be driven respectively by the decoder drivers $DD_1$ and $DD_2$ and the time lapse of this time exposure photographing will be indicated from one second to 99 seconds. When the releasing operation (second) is made again in order to terminate the photographing, the output of the OR gate $ORG_1$ will reverse to the "L" level for a predetermined time and will be given to one input (7) of the NOR gate $NOG_1$, therefore the output (8) of the NOR gate $NOG_1$ will reverse to the "H" level and will operate the AND gate $ANG_3$ and the shutter blades will be closed the same as is described above. Further, by the generation of the closing signal by the reversing operation of the one-shot multivibrator circuit $OSM_3$, the flip-flop circuit $FF_3$ will be reset through the AND gate $ANG_2$.

Such free opening and closing operation as is made in a large camera using dry plates or the like shall be explained in the following. After the switches $S_1$ and $S_2$ are closed, when the free opening and closing operation switch $S_{11}$ is switched over to the terminal S from the terminal R, the flip-flop circuit $FF_6$ will be set, the output will reverse to the "H" level and this signal will be given to one of the input terminals of the OR gate $ORG_1$. Further, when the output of the flip-flop circuit $FF_6$ reverses to the "H" level, both outputs of OR gates $ORG_6$ and $ORG_7$ will reverse to the "H" level and the output of a NOR gate $NOG_3$ will reverse to the "L" level but the output of an OR gate $ORG_5$ will keep the state of the "H" level as one input terminal is placed on the "H" level through a capacitor $C_5$. Therefore, the output of an AND gate $ANG_9$ will once reverse to the "H" level. Further, when the output of the OR gate $ORG_7$ reverses to the "H" level, the output of the NAND gate $NAG_1$ will reverse to the "L" level and will operate a one-shot multivibrator circuit $OSM_5$. Therefore, the output of the one-shot multivibrator circuit $OSM_5$ will reverse to the "L" level for a predetermined time and will reverse the output of the OR gate $ORG_9$ to the "L" level for a predetermined time. As a result, the same signal as the signal from the one-shot multivibrator circuit $OSM_2$ will be given to the other input of the AND gate $ANG_6$, therefore the transistor $Q_{13}$ will conduct, on the other hand, the output of the NOR gate $NOG_5$ will reverse to the "H" level, the output of the AND gate $ANG_{11}$ will be reversed to the "H" level and therefore the transistors $Q_8$ and $Q_9$ will conduct. Therefore, the electric charge of the capacitor $C_3$ will be discharged through the transistors $Q_{12}$ and $Q_9$ and the actuator SA will be driven to open the shutter blades. In this opened state of the shutter blades, the state of the focal depth can be observed. Thereafter, in order to close the shutter blades, the switch $S_{11}$ is returned to the terminal R to reset the flip-flop circuit $FF_6$. In this case, first each transistor will return to the initial state but the output of the AND gate $ANG_9$ will again reverse to the "L" level and therefore the one-shot multivibrator circuit $OSM_4$ will operate. Therefore, the output of the one-shot multivibrator circuit $OSM_4$ will reverse to the "L" level for a predetermined time and will reverse the output of the NOR gate $NOG_4$ to the "H" level for a predetermined time. As a result, the same signal as the signal from the one-shot multivibrator circuit $OSM_3$ will be given to the other input of the OR gate $ORG_8$, therefore the transistor $Q_6$ will conduct, on the other hand, the output of an AND gate $ANG_{10}$ will be reversed to the "H" level and therefore the transistors $Q_{15}$ and $Q_{16}$ will conduct. Therefore, the electric charge of the capacitor $C_4$ will be discharged through the transistors $Q_5$ and $Q_{16}$ and the actuator SA will be driven to close the shutter blades. When the output of the flip-flop circuit $FF_6$ is reversed to the "H" level by the operation of the switch $S_{11}$, a transistor $Q_{21}$ will conduct. As a result, a luminous diode $L_3$ will light to indicate the free opening and closing operation state.

The prefocusing operation shall be explained in the following. After the switches $S_1$ and $S_2$ are closed, when the prefocusing operation switch $S_{12}$ is switched over to the terminal S from the terminal R, the flip-flop circuit $FF_7$ will be set, the output will be reversed to the "H" level and this signal will be given to one of the input terminals of the OR gate $ORG_1$. Further, when the output ($\overline{Q}$) of the flip-flop circuit $FF_7$ is reversed to the "H" level, the NOR gate $NOG_3$ and OR gates $ORG_6$ and $ORG_7$ will be reversed and therfore the same as in the case of the free opening and closing operation the shutter blades will be opened. On the other hand, when the output (Q) of the flip-flop circuit $FF_7$ reverses to the "H" level, a transistor $Q_{24}$ will conduct to short-circuit the pull-out terminal of the potentiometer $VR_1$. Therefore, one input potential of the servo amplifying circuit will be on the zero level and will be unbalanced and therefore the servomotor SM will be driven to fully open the diaphragm blades. With this operation of fully opening the diaphragm blades, the potentiometer $VR_2$ will be adjusted to reduce the divided potential. However, even when the diaphragm blades are fully opened, due to the presence of the additional resistor $r_{12}$, the divided potential will not be able to lower to the zero level. Therefore, as it is, a current tending to further open the diaphragm blades from the fully opened state will continue to flow to the servomotor SM. However, when the output (Q) of the flip-flop circuit $FF_7$ reverses to the "L" level, a transistor $Q_{23}$ will conduct and therefore an OR gate $ORG_{10}$ will have the output reversed to the "H" level after a predetermined time by the time constant determined by a resistor $r_{11}$ and capacitor $C_6$ and will conduct a transistor $Q_{25}$. As a result, from this time, the other input potential of the servo amplifying circuit will be on the zero level and therefore the current will no longer flow to the servomotor SM. By this operation, both shutter blades and diaphragm blades will be fully opened, therefore focusing can be exactly made and the state of the composition can be observed. Thereafter, in order to close the shutter blades and to return the diaphragm blades to the set aperture position, the switch $S_{12}$ is returned to the terminal R to reset the flip-flop circuit $FF_7$. The shutter blade closing operation is the same as in the case of the above described free opening and closing operation. Further, when the output of the flip-flop circuit $FF_7$ reverses, the transistors $Q_{24}$ and $Q_{25}$ will be cut off in turn and terefore the diaphragm blades will be sqeezed into the aperture position set by the potentiometer. By the way, when the output (Q) of the flip-flop circuit $FF_7$ is reversed to the "H" level by the operation of the switch $S_{12}$, a transistor $Q_{22}$ will conduct. As a result, a luminous diode $L_4$ will light and will indicate the prefocusing operation state. In the above described free opening and closing operation and prefocusing operation, the switch $S_7$ will not operate, because, in this operation, the flip-flop circuit $FF_2$ will not operate to reverse and the output ($\overline{Q}$) will be placed on the "H" level to hold the NOR gate $NOG_2$ in the inoperable state. Further, when the camera is charged with the film, the free opening and closing operation and prefocusing operation will not be made. That is to say, when the camera is charged with the film, the film sensing switch $S_3$ will be closed, one input of the NAND gate $NAG_1$ will lower to the "L" level and its output will reverse to the "H" level. Therefore, even if the output of the OR gate $ORG_7$ is reversed to the "H" level by the switching of the switch $S_{11}$ or $S_{12}$ over to the terminal S, the output of the NAND gate $NAG_1$ will remain on the "H" level, will not reverse and will not operate the one-shot multivibrator circuit $OSM_5$. In both operations, if the camera is charged with the film, the switch $S_3$ will be closed, the output of the OR gate $ORG_5$ will reverse to the "L" level and will reverse the output of the NAND gate $NAG_9$ to the "L" level and therefore the one-shot multivibrator circuit $OSM_4$ will operate to close the shutter blades. Further, after the switch $S_4$ is operated to release the shutter (while the shutter blades are open), the output Q of the flip-flop circuit $FF_2$ will reverse to the "H" level and will hold the outputs of the OR gate $ORG_9$ and NOR gate $NOG_4$ respectively on the "H" level and "L" level and therefore, even if the switch $S_{11}$ or $S_{12}$ is operated, the free opening and closing operation or prefocusing operation will not be made. As described above, various signals are given to the input of the OR gate $ORG_1$ acting to actually release the shutter. In case the voltage of the current source $V_{DD}$ is below the rated value, in case the shutter blades were not operated in the previous operation and the state is not reset, in case the charged voltage of the capacitor $C_4$ ($C_3$) does not reach the rated value or in case the free opening and closing operation or prefocusing operation is made, even if it is attempted to release the shutter by operating the switch $S_4$, the shutter will not be released. Also, while the shutter is opened by each operation, if the switches $S_1$ and $S_2$ are opened, the shutter blades will be closed and the diaphragm blades will be squeezed in. That is to say, when the switches $S_1$ and $S_2$ are opened, the electric charge of the capacitor $C_2$ will be discharged through the resistor $r_2$ and the capacitor will become a substitute current source for the entire predetermined time circuit, a transistor $Q_1$ will conduct with relation to the discharging operation of the capacitor $C_1$ and its collector potential will be lifted to the "H" level. Therefore, the output of the AND gate $ANG_4$ will reverse to the "H" level to operate the one-shot multivibrator circuit $OSM_3$ through the OR gate $ORG_3$ and therefore the shutter blades will be closed. Further, the output of the OR gate $ORG_{10}$ will reverse to the "H" level, will conduct the transistor $Q_{25}$ and will short-circuit the pull-out terminal of the potentiometer $VR_2$ to lower the other input potential of the servo amplifying circuit to the zero level and therefore the servomotor SM will be driven to squeeze in the diaphragm blades. When the discharging operation of the capacitors $C_1$ and $C_2$ is completed after a predetermined time, the entire circuit will be perfectly cut off the current source and therefore the servomotor SM will stop the operation with the blades moved to the minimum aperture position. By the way, the diaphragm blades will be moved always to the minimum aperture position as described above when the switches $S_1$ and $S_2$ are opened but will be moved to the reset aperture position when the switches $S_1$ and $S_2$ are closed prior to the next photographing.

In each of the above explained embodiments, the RS type flip-flop circuit is used as an abnormal state discriminating means. Embodiments in which a D type flip-flop circuit is used in place of the flip-flop circuit of this type shall be explained in the following. In these embodiments, the shutter controlling circuit part is shown by a block diagram. Further, in the formation of these embodiments, the releasing operation itself for operating the switch S4 will not be able to be made at the time of detecting an abnormal state. Therefore, the circuit corresponding to the OR gate ORG1 in the already explained embodiments is eliminated here. Further, even in these embodiments, the same reference numerals are attached respectively to the same elements as the circuit elements in the already explained embodiments. First of all, in FIG. 6, reference numeral 1 denotes a release pulse generating circuit operated with the releasing operation, 2 denotes a shutter opening pulse generating circuit, 3 denotes a driving circuit for opening the shutter blades, 4 denotes a delay circuit for determining the exposure time, 5 denotes a shutter closing pulse generating circuit and 6 denotes a driving circuit for closing the shutter blades. Reference numeral 7 denotes a D type flip-flop circuit which has a data signal input terminal (D), clock signal input terminal (C), resetting signal input terminal (R) and output terminal (Q). The clock signal input terminal (C) is connected to the output terminal of the shutter closing pulse generating circuit 5. Symbol $S_{13}$ denotes a switch which is kept closed while the shutter blades are kept open, is connected between a current source and the earth through a resistor $r_{15}$ and is connected at the connecting point with the resistor $r_{15}$ to the data signal input terminal (D) of the D type flip-flop circuit 7. Symbol $Q_{26}$ denotes a transistor which is connected at the base to the output terminal (Q) of the D type flip-flop circuit 7 through a resistor $r_{16}$ and is earthed at the emitter. Symbol $L_9$ denotes a warning luminous diode. $M_g$ denotes a magnet arranged to lock a shutter releasing mechanism. The diode $L_9$ and magnet Mg are connected in parallel with each other and are connected between the current source and the collector of the transistor $Q_{26}$. Symbol $S_{14}$ denotes a resetting switch which is connected between the current source and earth through a resistor $r_{17}$ and is connected at the connecting point with the resistor $r_{17}$ to the resetting signal input terminal (R) of the D type flip-flop circuit 7. According to this controlling circuit, after the current source is put in, when a releasing operation is made, the connection and mechanism of the respective part will normally act and the actuator SA will operate through the pulse generating circuit 2 and driving circuit 3 and, when the shutter opens, the shutter switch $S_{13}$ will be closed as operatively connected, for example, with the opening shutter driving member and will be kept closed while the shutter is opened. As shown by the solid line in FIG. 7, the point (a) will be held on the "L" level meanwhile and the data signal input terminal (D) will be placed on the "L" level. Thus, when the proper exposure time elapses and shutter closing pulses are generated from the pulse generating circuit 5, the actuator SA will operate in the reverse direction through the driving circuit 6 and the shutter will close with a mechanical operation delay from the time of generating the closing pulses. In such case, when the shutter closing pulses are generated, the output terminal (b) of the pulse generating circuit 5 will rise on the "H" level from the "L" level as shown in FIG. 7 and the signal will be put into the clock signal input terminal (c) of the D type flip-flop circuit 7. However, as mentioned above, at the time of this rising, the data signal input terminal (D) will be on the "L" level, therefore the D type flip-flop will not reverse, the output terminal (Q) will be placed on the "L" level and the warning circuit will not operate. On the other hand, due to a disconnection of the connector connection, break of the line or mechanical failure of the shutter opening and closing mechanism, even if the releasing operation is made, the shutter will not open. In such case, after the current source is put in, when the releasing operation is made, even if pulses are generated from the shutter opening pulse generating circuit 2, the shutter will remain closed and the shutter switch $S_{13}$ will be kept open and therefore the point (a), that is, the data signal input terminal (D) of the D type flip-flop circuit 7 will be held on the "H" level (as shown by the dotted line in FIG. 7). Even in this case, if a proper exposure time is set in the circuit and pulses are generated from the shutter closing pulse generating circuit 5 by the output of the delay circuit 4, the point (b), that is, the clock signal input terminal (c) of the D type flip-flop 7 will rise on the "H" level from the "L" level. Therefore, at this time, the data signal input terminal (D) will be on the "H" level, therefore the D type flip-flop circuit 7 will reverse and the output terminal (Q) will be on the "H" level. Thereby, the transistor $Q_{26}$ will conduct, will operate the magnet Mg and will lock the releasing mechanism, the luminous diode $L_9$ will emit light and a warning will be issued. This state will be held until the current source is cut but, after it is confirmed, the resetting signal will be given to the resetting terminal (R) of the D type flip-flop circuit 7 by closing the resetting switch $S_{14}$ and therefore the D type flip-flop circuit 7 will return to the initial state. Therefore, after the cause of the faulty operation is removed, if the releasing operation is repeated, the normal operation will be made as mentioned above.

Figure 8:
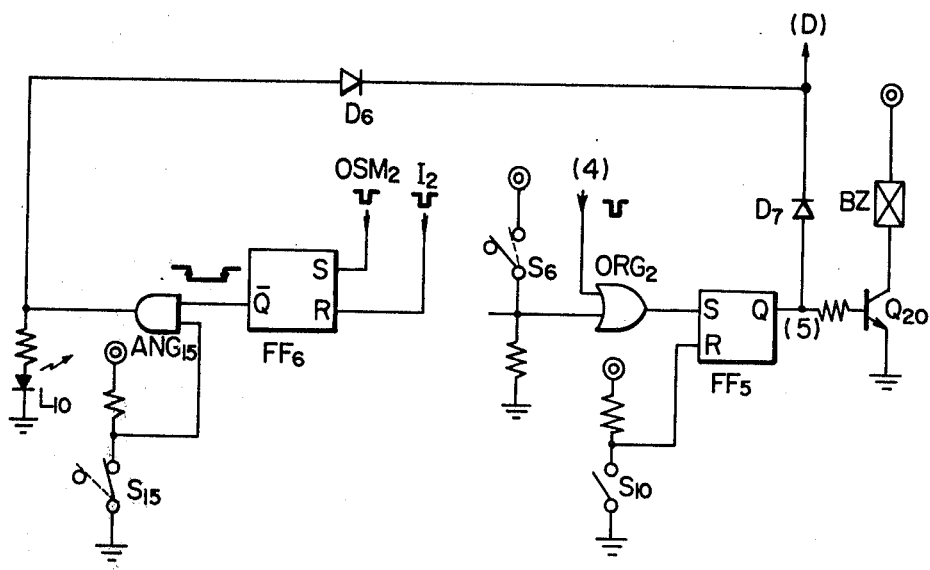
FIG. 8 is a wiring diagram showing further another embodiment of the shutter operation detecting part.

In each of the above embodiments, when the shutter blades are opened and the switch $S_6$ ($S_{13}$) is closed, if the closing signal is generated, the abnormality warning and release obstruction will not be made. However, even if, by any cause, the shutter blades are opened from before the releasing operation and the switch $S_6$ ($S_{13}$) is closed from the beginning, the abnormality warning and release obstruction will not be made. FIG. 8 shows an embodiment formed so as to be able to eliminate such defect. That is to say, according to the embodiment in FIG. 8, a switch $S_{15}$ which will be on when the shutter blades are closed but will be off when they are not closed, a flip-flop circuit $FF_6$, an AND gate $ANG_{15}$, a luminous diode $L_{10}$ and diodes $D_6$ and $D_7$ are added. Shutter opening controlling pulses, that is, reversing signals of the one-shot multivibrator $OSM_2$ as setting input signals and shutter closing controlling pulses, that is, output signals of the inverter $I_2$ as resetting input signals are to be given to the flip-flop circuit $FF_6$. Therefore, in the state before the releasing operation, if the shutter blades are not closed and the switch $S_{15}$ is opened, as the AND gate $ANG_{15}$ has both inputs on the "H" level, the output will be on the "H" level and the luminous diode $L_{10}$ will light and will warn the abnormal state. Further, as the signal on the "H" level of the AND gate $ANG_{15}$ is given to one input terminal of the OR gate $ORG_1$, even if the releasing operation is made, the output of the OR gate $ORG_1$ will remain held on the "H" level and no actual releasing operation will be made. On the other hand, if the shutter blades are normally closed, the switch $S_{15}$ will be on, the output of the AND gate $ANG_{15}$ will be placed on the "L" level and therefore the above mentioned warning operation and release obstructing operation will be made. When the releasing operation progresses from the normal state and negative pulses are generated in the output of the one-shot multivibrator $OSM_2$ for controlling the opening of the shutter blades, the flip-flop circuit $FF_6$ will be set and the output $\overline{Q}$ will reverse to the "L" level. Therefore, even if the shutter blades open for the exposure controlling operation and the switch $S_{15}$ is off, the output of the AND gate $ANG_{15}$ will be held on the "L" level and therefore, when this switch $S_{15}$ is off, the luminous diode $L_{10}$ will not light. Further, if negative pulses are generated in the output of the inverter $I_2$ by the generation of the shutter blades closing signal, the flip-flop circuit $FF_6$ will be reset and its output $\overline{Q}$ will return to the "H" level. If the shutter blades are normally operated by the generation of the closing signal, the switch $S_{15}$ will close and therefore the warning operation and release obstructing operation will not be made. However, even if the closing signal is generated, if the shutter blades are not closed by any cause and the switch $S_{15}$ remains open, as described above, the warning operation will be made and the releasing operation will be obstructed. When the closing signal is generated, in case the shutter blades are not opened and the switch $S_6$ remains closed, as already described, the warning operation and release obstructing operation will be made. If the transistor $Q_{20}$ is connected at the base to the connecting point side of the diodes $D_6$ and $D_7$, various abnormal states will be able to be warned by one buzzer BZ without providing the luminous diode $L_{10}$.

Figure 6:
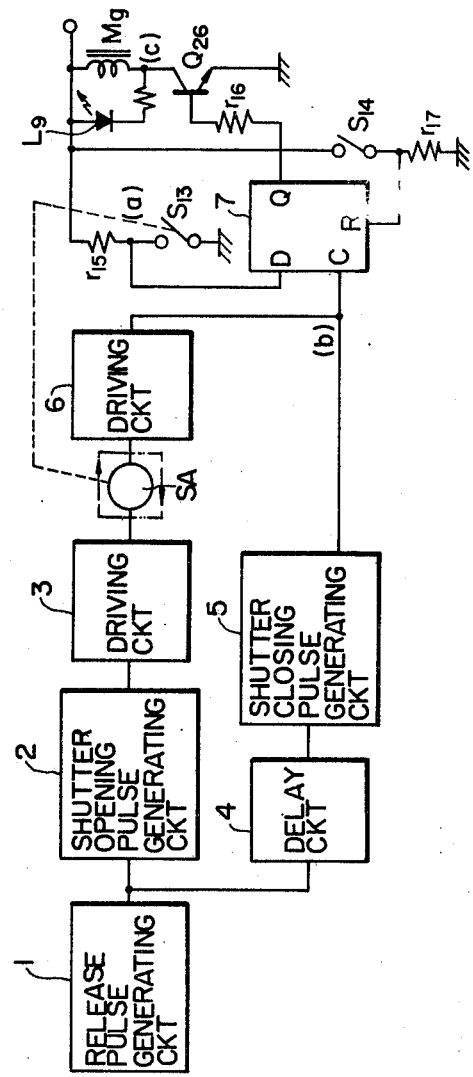
FIG. 6 is a wiring diagram showing further another embodiment of the controlling circuit according to the present invention.
Figure 7:
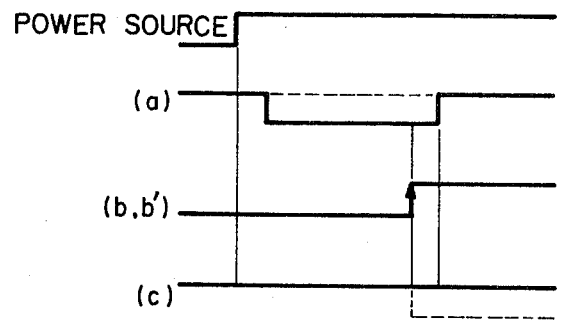
FIG. 7 is a time chart for explaining the operation of the embodiment shown in FIG. 6.
Figure 9:
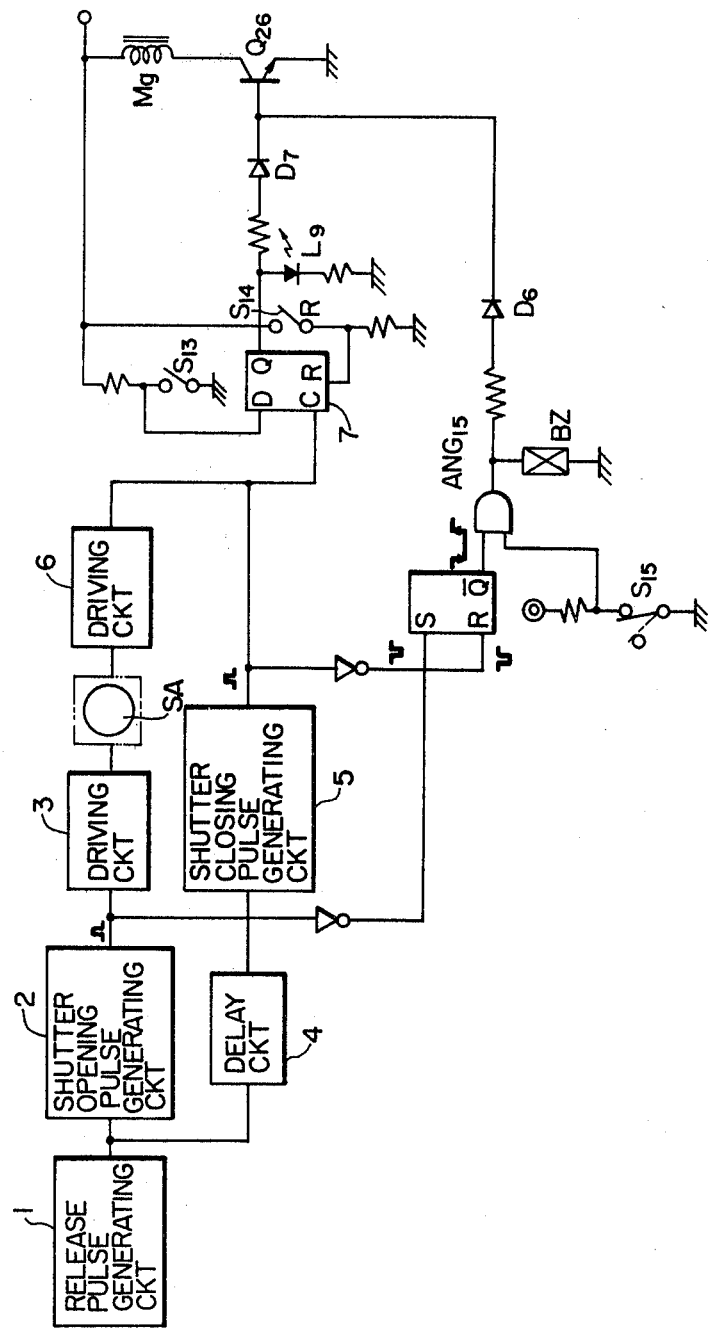
FIG. 9 is a wiring diagram showing further another embodiment of the controlling circuit according to the present invention.

FIG. 9 shows an embodiment in the case that the above described warning function is given to the circuit in FIG. 6. That is to say, in this embodiment, at the time of the releasing operation, if the shutter blades are opened, the buzzer BZ will operate and the magnet MG will be energized and, as a result, the releasing operation will become impossible. In this embodiment, if the luminous diode $L_9$ is connected in parallel with the magnet Mg as in FIG. 6, various abnormal states will be able to be known with one luminous diode $L_9$ without providing the buzzer BZ.

As understood from the above explanation, each of the switches $S_6$, $S_{13}$ and $S_{15}$ is not limited to a mechanical switch but can be replaced with such switch of any known system as a light switch or magnetic switch. Further, the luminous diode and buzzer can be replaced with each other. These warning elements can be simultaneously used in the form of a pair connected in parallel.

The above explained controlling circuit can be incorporated within the shutter device together with the shutter mechanism but the other elements than the elements (for example, the actuator SA) related directly with the operations of the shutter blades and diaphragm blades can be contained in another control box and this control box and the shutter device can be connected with each other through a connector so that such various operations as are described above can be made on the panel of the control box. In such case, large shutter devices (such as of #0, #1 and #3) which can be interchangeably used for large cameras can be operated with one control box. Generally, the larger the shutter device, the larger the exposure aperture and the maximum shutter speed can not help being reduced. The maximum shutter speed is so designed as to be, for example, 1/500 second with the #0 shutter, 1/250 second with the #1 shutter and 1/125 second with the #3 shutter. Generally, the shutter speed can be set up to 1/500 second on the panel of the control box. Therefore, it is necessary to indicate what number shutter is used. According to the invention, in order to meet this requirement, in a shutter device, a signal part corresponding to the size of the shutter device is formed and a selecting switch $S_9$ operated by the signal part is provided so that the indication can be made with the setting position of this switch $S_9$. That is to say, in case the #0 shutter is attached to the camera body, the switch $S_9$ will be placed in the illustrated normal position and the attached state will be indicated by the fact that luminous diodes $L_6$ and $L_7$ will not be lighted. When the #1 shutter device is attached to the camera body, the switch $S_9$ will be connected to the left side terminal and the luminous diode $L_6$ will be lighted. When the #3 shutter device is attached, the switch $S_9$ will be connected to the right side terminal and the luminous diode $L_7$ will be lighted. When the switch $S_9$ is placed in the normal position, one input of each of AND gates $ANG_{12}$, $ANG_{13}$ and $ANG_{14}$ will be placed on the "H" level. Therefore, when, by the operation of the counter $CO_1$ (though not indicated, the output terminals of the counter $CO_1$ shall be described conveniently as $q_1$, $q_2$, $q_3$, ... from the left), the output terminal $q_1$ reverses to the "H" level after 1/500 second, this "H" level signal will appear on the output side of an OR gate $ORG_{13}$ through the AND gate $ANG_{12}$, an OR gate $ORG_{11}$ and the AND gate $ANG_{14}$. Also, when the above mentioned output terminal $q_2$ reverses to the "H" level after 1/250 second, this "H" level signal will appear on the output side of an OR gate $ORG_{12}$ through the AND gate $ANG_{13}$. In case the #1 shutter device is attached to the camera body, the switch $S_9$ will be connected to the left side terminal and one input of the AND gate $ANG_{12}$ will be held on the "L" level. The #1 shutter is of a maximum speed of 1/250 second. However, even in case the exposure time is set at 1/500 second (the switch $S_5$ is connected to the output terminal of the OR gate $ORG_{13}$) on the operating panel of the control box, the #1 shutter will operate at 1/250 second. That is to say, even if the above mentioned output terminal $q_1$ reverses to the "H" level after 1/500 second in the operation of the counter $CO_1$, the signal will be cut in the AND gate $ANG_{12}$. When the above mentioned output terminal $q_2$ reverses to the "H" level after 1/250 second, this signal will appear on the output side of the OR gate $ORG_{13}$ through the OR gate $ORG_{11}$ and AND gate $ANG_{13}$. In the same manner, in case the #3 shutter device is attached, even if the exposure time is set at 1/500 and 1/250 second, the controlling signal will be of after 1/125 second.

We claim:
1. A drive controlling circuit for electric shutters comprising a release pulse generating circuit capable of being operated by a releasing operation, a shutter opening pulse generating circuit connected to said release pulse generating circuit and capable of being operated by an output signal from said release pulse generating circuit, an exposure time controlling circuit connected to said release pulse generating circuit and capable of being operated by an output signal from said release pulse generating circuit, a shutter closing pulse generating circuit connected to said exposure time controlling circuit and capable of being operated by an output signal from said exposure time controlling circuit, an actuator means connected to said shutter opening pulse generating circuit and shutter closing pulse generating circuit and capable of being operated to open a shutter by an output signal from said shutter opening pulse generating circuit and capable of being operated to close the shutter by an output signal from said shutter closing pulse generating circuit, a first switching means provided in association with said actuator means and capable of taking a first state and second state and capable of being switched over to the second state from the first state when the shutter is opened, a first discriminating circuit connected to the shutter closing pulse generating circuit and first switching means and capable of issuing an output signal when an output signal is issued from said shutter closing pulse generating circuit only in case said first switching means is in the first state, and a first warning means connected to said first discriminating circuit and capable of being operated by an output signal from said first discriminating circuit.

2. A drive controlling circuit according to claim 1 wherein said drive controlling circuit for electric shutters further comprises a second switching means provided in association with said actuator and capable of taking the first state when the shutter is closed and the second state when the shutter is not closed; a second discriminating circuit connected to said shutter opening pulse generating circuit, shutter closing pulse generating circuit and second switching means and capable of issuing an output signal only when said second switching means is in the second state before an output signal is issued from said shutter opening pulse generating circuit and after an output signal is issued from said shutter closing pulse generating circuit, and a second warning means connected to said second discriminating circuit and capable of being operated by an output signal from said second discriminating circuit.

3. A controlling circuit according to claim 1 or 2 characterized in that said first discriminating circuit comprises a gate circuit and an RS type flip-flop circuit, said gate circuit is connected to said shutter closing pulse generating circuit and first switching means and generates an output signal when an output signal is issued from said shutter closing pulse generating circuit only in case said first switching means is in the first state and said flip-flop circuit has a setting input terminal connected to said gate circuit and an output terminal connected to said first warning means.

4. A drive controlling circuit according to claim 1 or 2 characterized in that said first discriminating circuit is formed of a D type flip-flop circuit having a clock input terminal connected to the output terminal of said shutter closing pulse generating circuit, a data input terminal connected to said first switching means and an output terminal connected to said first warning means and puts out an input signal given to said data input terminal from said output terminal to operate said first warning means when an input signal is given to said clock input terminal only in case said first switching means is in the first state.

5. A drive controlling circuit according to claim 1 or 2 characterized in that said warning means is a luminous diode.

6. A drive controlling circuit according to claim 1 or 2 characterized in that said warning means is a buzzer.

7. A drive controlling circuit according to claim 1 or 2 characterized in that said warning means is an electromagnetic device capable of being operated to obstruct the releasing operation for starting said release pulse generating circuit.

8. A drive controlling circuit according to claim 1 or 2 wherein said warning means is formed of a gate circuit connected to the output terminal of said release pulse generating circuit and the output terminal of said discriminating circuit so that, when an output signal is issued from said discriminating circuit, an output signal from said release pulse generating circuit will not be given to said shutter opening pulse generating circuit and exposure time controlling circuit.

9. A drive controlling circuit according to claim 2 characterized in that the output terminal of said first discriminating circuit is connected to the output terminal of said second discriminating circuit in order to use said first warning means also as said second warning means.

10. A drive controlling circuit according to claim 1 or 2 characterized in that said actuator comprises a motor rotated in the opposite directions respectively by an output signal from said shutter opening pulse generating circuit and an output signal from said shutter closing pulse generating circuit.

11. A driving controlling circuit according to claim 1 or 2 characterized in that said actuator comprises a shutter opening driving electromagnetic device capable of being controlled by an output signal from said shutter opening pulse generating circuit and a shutter closing driving electromagnetic device capable of being controlled by an output signal from said shutter closing pulse generating circuit.

12. A drive controlling circuit according to claim 3 characterized in that said warning means is a luminous diode.

13. A drive controlling circuit according to claim 4 characterized in that said warning means is a luminous diode.

14. A drive controlling circuit according to claim 3 characterized in that said warning means is a buzzer.

15. A drive controlling circuit according to claim 4 characterized in that said warning means is a buzzer.

16. A drive controlling circuit according to claim 3 wherein said warning means is formed of a gate circuit connected to the output terminal of said release pulse generating circuit and the output terminal of said discriminating circuit so that, when an output signal is issued from said discriminating circuit, an output signal from said release pulse generating circuit will not be given to said shutter opening pulse generating circuit and exposure time controlling circuit.

17. A drive controlling circuit according to claim 4 wherein said warning means is formed of a gate circuit connected to the output terminal of said release pulse generating circuit and the output terminal of said discriminating circuit so that, when an output signal is issued from said discriminating circuit, an output signal from said release pulse generating circuit will not be given to said shutter opening pulse generating circuit and exposure time controlling circuit.

* * * * *